Aug. 21, 1951 M. G. KRETZMER, JR 2,565,136
AUTOMATIC MOLTEN GLASS LEVEL CONTROL APPARATUS
Filed Aug. 7, 1948 2 Sheets-Sheet 2
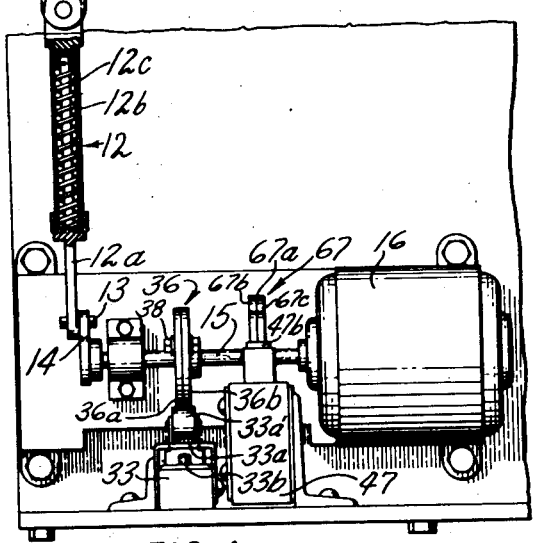
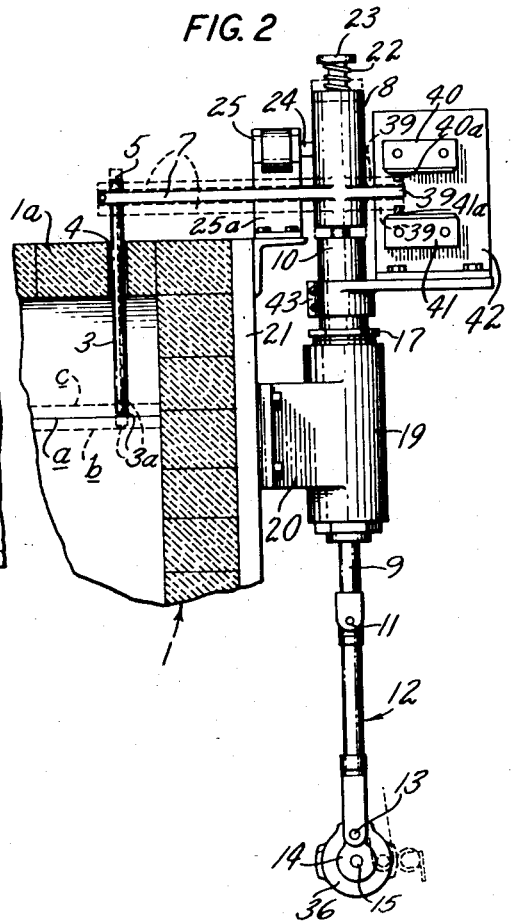
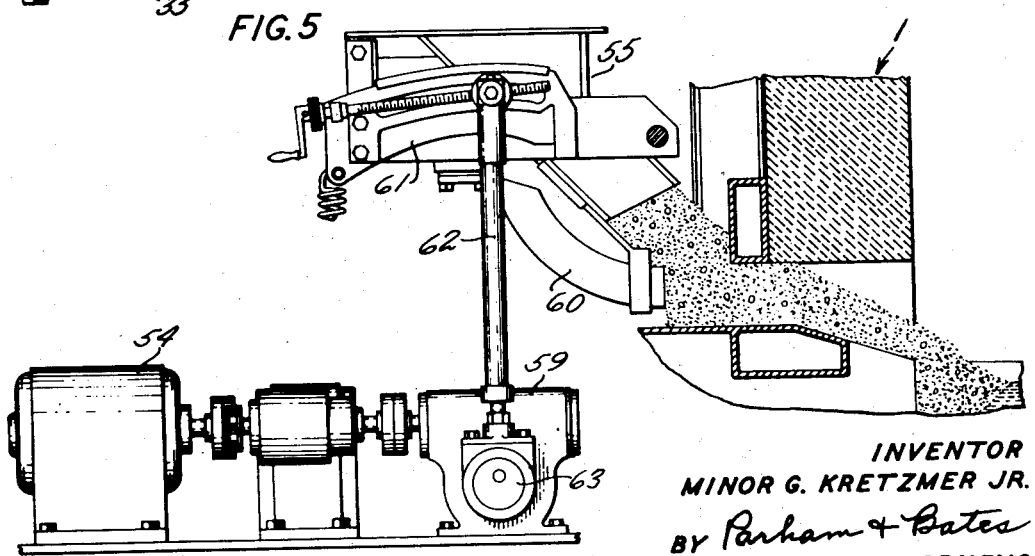
INVENTOR
MINOR G. KRETZMER JR.
BY Parham + Bates
ATTORNEYS Patented Aug. 21, 1951

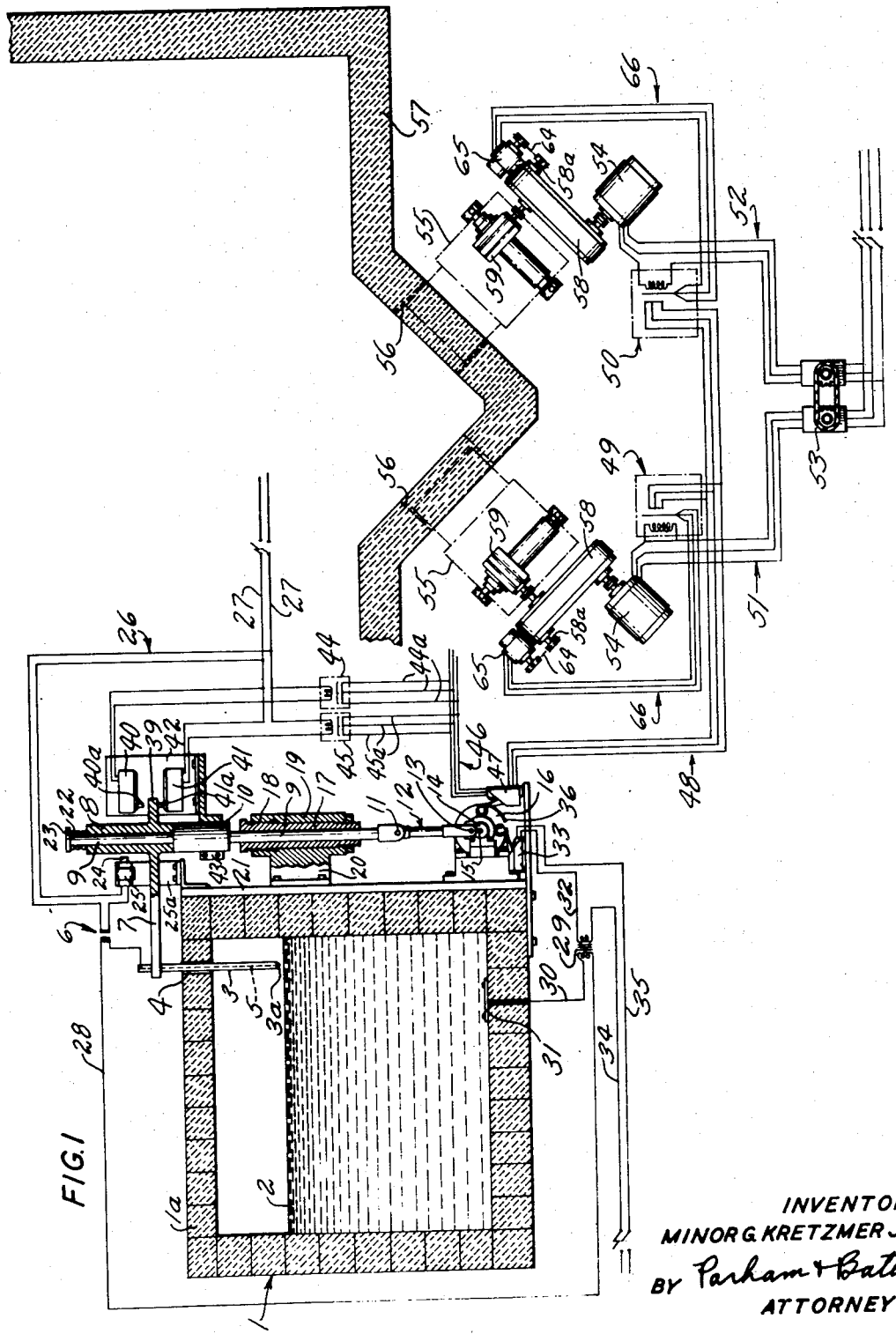

2,565,136

UNITED STATES PATENT OFFICE 2,565,136

AUTOMATIC MOLTEN GLASS LEVEL CONTROL APPARATUS

Minor G. Kretzmer, Jr., Wethersfield, Conn., assignor to Emhart Manufacturing Company, a corporation of Delaware Application August 7, 1948, Serial No. 43,082

10 Claims. (Cl. 214—18.2)

This invention relates to improvements in apparatus for automatically controlling the level of molten glass in a glass feeder forehearth or like glass container.

The invention relates more particularly to improvement in an automatic molten glass level control apparatus by which departures of the level of the glass in a controlled forehearth or like container from a predetermined desirable level or control point are automatically ascertained and are used to initiate corrective adjustments of means by which batch is supplied to a glass melting tank which constitutes the source of supply of molten glass of the controlled container.

An object of the invention is to provide an automatic molten glass level control apparatus which will work reliably and efficiently and with a minimum of attention after it once has been installed and preset or adjusted for the operation intended.

A further object of the invention is to provide a molten glass level control apparatus which will function mainly through the operation of electrical means under the control of suitable timing instrumentalities to increase the charging rate of the controlled batch charging means when the level in the controlled container falls below the predetermined control point and to decrease the charging rate when the glass level in the controlled container rises above that control point but to leave undisturbed the operation of the charging means so long as the level of the molten glass in the controlled container remains at the control point or within slight permissible variations therefrom.

A further object of the invention is the provision in an automatic molten glass level control apparatus of adjustable control means to determine the duration of the corrective adjustments of the batch charging rate which such apparatus will effect to correct departures of level from the predetermined control point of the molten glass in a controlled container.

A still further object of the invention is the provision in an automatic molten glass level control apparatus of a level gauging mechanism having a vertically reciprocable contact element which is moved in cyclic order downwardly from a predetermined relatively fixed upper limit to the surface of the molten glass, at whatever level that may be, and then upwardly again to the same upper limit, its cycles being under positive control from a motor driven timer so that a means responsive to the gauging mechanism for changing the charging rate of a connected batch charging means will receive its directions at optimum time intervals.

A still further object of the invention is the provision of a glass level gauging mechanism of a type which includes a vertically reciprocating feeler having an electrically conductive tip for contact with the molten glass together with positively driven timing means to control a circuit that may be completed on such contact so that the circuit will be broken before the feeler is raised from the glass surface, thereby obviating or minimizing possibility of arcing at that time.

Generally described, the apparatus of the invention comprises a glass level gauging mechanism having a vertically reciprocable gauging rod or feeler provided with an electrically conductive tip at its lower end. This feeler is reciprocated vertically along a path having a predetermined relatively fixed upper limit and a lower limit which varies with the level of the molten glass and always coincides therewith. Instead of requiring a reversible motor or the like to effect such reciprocations of the feeler, as taught by the prior art, the gauging mechanism of the present invention may include a unidirectional motor or the like as a prime mover to effect the reciprocations of the feeler which is moved under the direct control of the prime mover until its electrically conductive tip touches the molten glass, whereupon novel cooperative feeler movement controlling means of the present invention is rendered effective to stop the descent of the feeler at that particular level and to maintain it there for a predetermined time, at the end of which the prime mover, which has continued to operate, will again resume control of the feeler and will move it on an upstroke thereof. A pair of normally open, vertically spaced electric switches are mounted to move vertically with the feeler when the movements of the latter are under the direct control of the prime mover and so that relative movement between them and a fixed actuating arm on the feeler will cause closing of one or the other of them when the feeler is halted at a glass level detecting position indicative of a rise or fall of the glass level from a predetermined control point. The structural and operating provisions are such that the fixed actuating arm on the feeler will not close either of these switches when the gauged glass level remains at the control point or varies therefrom only to a very slight permissible extent.

Closing of either of the switches referred to will initiate action through suitable electrical circuit and control provisions, including a hold-in relay and a timing switch, to operate a reversible speed adjusting motor which is operatively connected with a then active independently driven batch charger so as to effect a corrective adjustment of the charging rate of such charger for a predetermined time. The charger thus affected may be the active one of a pair of associated similar chargers which have alternating periods of activity and inactivity, one being active while the other is idle, or the correction may be applied to both such chargers if both are active when the corrective provisions are rendered effective. The charger or chargers, of course, are applied to a glass melting tank from which the forehearth or like container containing the glass being gauged receives its glass in a known manner.

Other novel features of construction and operation and advantages of the invention hereinafter will be pointed out or will become apparent from the following description of a practical embodiment of the invention as shown in the accompanying drawings, in which:

Fig. 1 is a view which shows in a diagrammatic way a level control apparatus in the form now preferred by me, including a level gauging mechanism operatively applied to a molten glass containing forehearth, which is shown in transverse vertical section, and a pair of alternatingly active batch chargers applied to its supply melting tank, represented by a horizontal section of a portion of the tank wall;

Fig. 2 is a fragmentary vertical sectional view of the portion of the controlled glass holding container together with the level gauging feeler and its operating means and certain associate parts of the level gauge shown in elevation;

Fig. 3 is a front elevation of the gauge motor and certain motor driven and associate parts of the gauge;

Fig. 4 is an end view of the structure shown in Fig. 3, with a fragmentary portion of the glass container wall in section; and Fig. 5 is a side elevation of one of the batch chargers and its drive, a portion of the tank wall being shown in section.

Referring now to the drawings and more particularly to Fig. 1, the numeral 1 designates a section of a forehearth or a like container in which there is a body of molten glass 2, the level of which is to be controlled. A vertically reciprocable feeler 3 depends through a suitable opening 4 in the cover 1a of the container. The feeler 3 is shown as a rod-like member of a material, such as porcelain or the like, suitable for use in a forehearth or other container holding a body of molten glass. The lower end of this feeler terminates in an electrically conductive tip, designated 3a. This tip may be of platinum or a platinum alloy or other material suitable for use at the place and for the service intended. An electrical conductor, shown as a wire 5, extends through the feeler 3 to the tip 3a thereof and projects from the upper end of the feeler so as to connect with one side of a relay, shown diagrammatically at 6. The feeler 3 is carried by an overhanging arm 7 on a feeler sleeve 8 which is slidably mounted on a vertically reciprocable carrier rod 9 above a stop element 10 which occupies a fixed position on the rod and supports the sleeve on the rod for movement therewith when the sleeve is at the lower limit of its sliding movement on the rod as shown in Fig. 1. In the example shown, the stop element 10 is a diametrically enlarged integral portion of the rod 9, but obviously it might be a separate member fixed in position thereon.

The lower end of rod 9 is pivotally connected at 11 with the upper end of a link 12 which is pivotally connected at its lower end at 13 to a crank 14 on a shaft 15 having a driven connection with a motor 16. The specific construction just described is shown in relatively enlarged form and in greater detail in Figs. 3 and 4. As shown in Fig. 3, the link 12 comprises a lower section 12a extending slidably into a tubular upper section 12b, a compression coil spring 12c being operatively incorporated in the link between the upper end of the section 12a and the lower end of the section 12b so as to yieldingly permit elongation of the link under a pull thereon from the crank 14 when downward movement of the upper section of the link has been stopped, this for a purpose hereinafter to be explained.

The rod 9 is guided in its vertical reciprocations by a bushing 17 which is screw threadedly engaged at 18 with a vertical supporting tubular portion 19 of a bracket 20 on a fixed frame member 21 at one side of the molten glass holding container 1. The bushing 17 also serves as a vertically adjustable stop to limit the downward movement of the relatively enlarged stop element 10 and hence of the carrier rod 9.

The feeler sleeve 8 tends to rest by gravity on the stop 10 as shown in Fig. 1 and a light coil spring 22 may be disposed between a retaining button 23 or the like at the top of the rod 9 and the top of the sleeve 8 to increase this tendency or make it more positive without preventing limited relative vertical movements between the sleeve 8 and the stop 10 at times, as when downward movement of the sleeve 8 has been stopped while the rod 9 continues downward under pull from its crank. This result will be effected when a friction brake element 24 is moved by energization of a brake operating solenoid 25 against the adjacent side of the sleeve 8 at a time when the stop 10 has not yet descended onto the adjustable stop 17.

The solenoid 25 is supported, as on the bracket 25a, in a predetermined relatively fixed operative position adjacent to the vertically movable sleeve 8 and is provided with operating connections to energize it when the tip 3a of the feeler 3 touches the surface of the molten glass. To this end, wires 26 connect the solenoid to lead wires 27 and the hereinbefore mentioned relay 6 also is operatively incorporated in the solenoid operating circuit. As previously pointed out, the feeler wire 5 leads to this relay. A wire 28 which is connected to the same side of the relay 6 as the feeler wire 5 leads to one side of a transformer 29. That side of the transformer also is connected by a wire 30 to a grounded connection at 31 with the body of molten glass 2. The other side of the transformer 29 is connected by a wire 32 to one side of a normally open remote control electric timing switch 33 and to a lead wire 34. The other side of switch 33 is connected to a second lead wire, designated 35, which is cooperatively associated with the lead wire 34. The switch 33 times the period during which a circuit effective to energize the solenoid 25 may be completed through the glass 2 by a contact of the feeler tip with such glass. By reference to Figs. 3 and 4, it will be seen that switch 33 is provided with a pivoted operating lever 33a carrying a cam roller 33a′ riding on the periphery of a cam 36 on the aforesaid motor driven shaft 15. The cam 36 includes a relatively high portion 37, Fig.

4, which, at a predetermined time in each cycle of rotation of the shaft 15 and cam 36, will actuate the lever 33a to push a switch closing button or stem 33b downward to close the switch and will keep the switch closed for the period during which the cam roller 33a' is on the high portion of the cam.

The operation of the gauging mechanism as described so far is substantially as follows. The lead wires 34 and 35 supply electric current through the switch 33 when the latter is closed to the transformer 29 which reduces the line voltage as, for example, to 24 volts maximum potential. Operation of the motor 16 will rotate the shaft 15 and the cam 36 thereon, as in a clockwise direction as shown by the direction arrow on the cam in Fig. 4. This in due course will cause closing of the switch 33 in the manner described. The switch closing cam 36 preferably is constructed to permit adjustment of the angular extent of the high portion 37 thereof, as by comprising two relatively angularly adjustable disc sections 36a and 36b, respectively having high portions 37a and 37b, and fastened together in their angularly adjusted relationship by a fastening device 38 so that their combined high portions together form the aforesaid cam high portion 37 of a predetermined angular extent. The time in the cycle of rotation of the motor shaft 15 when the switch 33 will be closed and, within limits, the duration of such period may thus be selected and adjusted. Preferably, the switch 33 is closed just before the contact tip of the feeler reaches the glass surface and the angular extent of the high portion of the cam 36 is adjusted to permit the switch 33 to open before the feeler is raised from the glass.

When the switch 33 is closed as described and the contact tip of the feeler is at the surface of the molten glass, the electric circuit thus established will act through the relay 6 to energize the solenoid 25 which is connected by means previously pointed out with a source of electric current which may be of higher voltage than that of the circuit which includes the molten glass 2. The brake 24 will be applied to and stop further downward movement of the sleeve 8 at the time of contact of the feeler tip with the molten glass. The rod 9 may continue downwardly if the stop 10 has not arrived at the adjustable stop 17 which had been preset relative to the desired glass level to be maintained. After stop 10 seats on stop 17, further pull on the link 12 by the crank 14 will elongate such link against the spring 12c.

By the means just described, the position of the sleeve 8 will be fixed in space at a level indicative of the glass level, this level being higher or lower as the glass level varies. The means by which such variations of level are translated according to the present invention into corrective adjustments of the associate batch charging means will now be pointed out.

The sleeve 8 carries a fixed arm 39 projecting outwardly therefrom at the side opposite the feeler arm 7 so as to move vertically in a path extending between a depending operating button or stem 40a of a normally open high level limit switch 40 and an upwardly projecting operating button or stem 41a of a normally open low level limit switch 41. These limit switches 40 and 41 are mounted on a bracket 42 which is mounted, as by a split collar type clamp 43, on the stop portion 10 of the rod 9. The arrangement is such that when the level of molten glass 2 remains at the desired control point, the reciprocations of the rod 9 and of the vertically spaced switches 40 and 41 carried thereby will not result in closing of either of these switches but one or the other thereof will be closed by the actuating arm 39 at the time of contact of the tip of the feeler with the surface of the molten glass if the glass level has risen or fallen undesirably from the control point. The action is illustrated in Fig. 2. When the level of the glass remains at the predetermined control point, as shown by the full line and indicated at a, the switch actuating arm 39 will remain spaced from the operating buttons of both the high level limit switch 40 and the low level limit switch 41. When the level of the molten glass has fallen considerably, as to the lower broken line position indicated at b, the actuating arm 39 will be at a lower position as indicated in broken lines and will have closed the low level limit switch 41. When the molten glass level has risen above the control point, as to the higher broken line, designated c, the actuating arm 39 will be at the higher position indicated by the higher broken lines and will have closed the high level limit switch 40.

Turning now again to Fig. 1, the switches 40 and 41 are electrically connected in parallel to the leads 27 and respectively are connected in series to one side of hold-in relays 44 and 45. The other side of each of these relays is operatively connected by three wires 44a or 45a to three wires collectively designated 46 which constitute a source of supply of three-phase electric current, the connections of the wires from the two relays to the individual wires being reversed as shown for a purpose to be presently explained.

The wires 46 lead to a normally open remote control timing switch 47 which is operatively connected by three wires collectively designated 48 to one side of each of like relays 49 and 50, respectively. These relays are controlled by operative connection with the circuit forming wires 51 and 52 which respectively lead from a control mechanism 53 to individual motors 54 for driving twin batch chargers 55. These chargers are operatively associated with charging ports 56 in a wall of a glass melting tank 57 for supplying molten glass to the container 1. As shown more or less diagrammatically in Fig. 1, the motors 54 operate variable speed drive units 58, which may be P. I. V. drives. These are connected through speed reduction units 59 with the chargers. As more clearly shown in Fig. 5, each of the chargers 55 may include a movable batch charging member 60 suspended from a lever 61 which is oscillated by a connecting rod 62 from the reduction unit 59, the connecting rod being driven through an eccentric crank arrangement indicated at 63. Each of the P. I. V. drive units includes a speed adjusting shaft 58a operatively connected, as by a chain and sprocket arrangement 64, with a reversible speed adjusting motor 65. These motors are electrically connected by the wires 66 with the relays 49 and 50, respectively, so that electric current may flow thereto from the wires 48 only when such relays are actuated by current passing thereto from the connected circuits for operating the motors 54.

The remote control switch 47 is shown more clearly by Figs. 3 and 4. It comprises an operating button or stem 47a, Fig. 4, and a pivoted operating lever 47b carrying a cam roller 47b' riding on the periphery of a cam 67 on the shaft 15. The cam 67 includes a relatively high portion 67a for actuating the lever 47b to close the switch 47. The cam 67, like the cam 36 previously described, comprises two cooperative disc sections 67b and 67c which may be angularly adjusted in relation to each other about the axis of the shaft 15 to vary the angular extent of the high portion 67a thereof, the two sections of the cam being secured in their angularly adjusted relationship by a fastening device like that shown for the cam 36 or in any other suitable known manner.

The operation of the batch charging rate adjustment provisions just described is substantially as follows. Assuming that the level of the molten glass in the container 1 has risen above the control point so as to effect closing of the high level limit switch 40, the electrical operating connections through the hold-in relay 44 to the timing switch 47 and thence to the adjusting motors 65 will be such as to operate one or both of these motors in one direction, this being the direction to reduce the speed of the connected batch charger, provided that the essential conditions for operation of that motor have been set up. Specifically, the remote control timing switch 47, which is normally open and which controls the beginning and the duration of a period of speed adjusting operation of an adjusting motor 65, must be closed by its cam. Also, since a variable speed drive of the type now preferred by me can be adjusted only when it is running, the motor and drive of one or both the chargers must be driving one or both of such chargers. If only one of the chargers is active, only its connected adjusting motor 65 will be operated, the other adjusting motor being kept inactive by its relay 49 or 50. Thus, if the high level limit switch 40 is closed while the timing switch 47 also is closed, the speed of the active charger, if only one of these chargers is operating, will be decreased for a predetermined adjusting period. Similarly, if the switch 41 is closed under like conditions, the adjusting motor 65 of the active charger will be operated in the reverse direction to increase the charging rate for a similar adjusting period. Of course, if both chargers are operating simultaneously then both relays 49 and 50 would be actuated to permit starting of both adjusting motors 65. In operation, the chargers are usually rendered active alternately for predetermined periods which are controlled by the control mechanism 53. The time of correction of the charging rate may be a very slight or a relatively greater part of such an operating period, this determined by the adjustment of the angular extent of the high portion 67a of the cam 67 for closing and keeping closed the remote control switch 47.

Many modifications and changes in the illustrative embodiment of the invention shown in the drawings and herein particularly described will now be obvious to or readily occur to those skilled in the art. I therefore do not wish to be limited to the details thereof.

I claim:

1. In a molten glass control apparatus, a level gauging mechanism comprising a feeler having an electrically conductive tip adapted for contact with molten glass, a vertically movable carrier for the feeler operable to move the feeler tip vertically between a raised position above a body of molten glass to be gauged and a lower position at least as low as the lowest level of the glass to be gauged, means including said electrically conductive tip to complete an electric circuit on contact of said tip with the molten glass, normally inactive means controlled by said circuit and actuated automatically on completion thereof to engage the feeler carrier to stop further downward movement of said carrier and thus stop the descent of the feeler tip promptly after contact of said tip with the molten glass, and operating means for said carrier including a vertically reciprocating carrier raising and lowering member operable on each upward stroke thereof to lift the carrier until the feeler tip is at its raised position and on each downward stroke thereof to lower said carrier in supporting relation thereto until the tip of the feeler carried thereby has been lowered into contact with the molten glass and further descent of the carrier has been stopped, said carrier raising and lowering member being free for further downward movement relative to said carrier after descent of the carrier has been stopped.

2. Mechanism as defined by claim 1 wherein said means to stop the descent of the feeler tip comprises a movable brake operatively positioned in relation to the feeler carrier and normally disengaged therefrom and a solenoid arranged to be energized on completion of said circuit to move said brake into movement-stopping engagement with the feeler carrier.

3. Mechanism as defined by claim 1 wherein said means to complete said electric circuit includes a normally open electric switch and switch operating means timed in relation to the operating means for said carrier to close said switch just before the feeler tip is lowered into contact with the glass and to open said switch before said feeler tip subsequently is raised from the glass.

4. Mechanism as defined by claim 1 wherein said means to complete said electric circuit includes a normally open electric switch and cam means operable by said feeler carrier operating means to close the switch at a predetermined time in each cycle of the carrier operating means, said cam means being adjustable to vary the time said switch will be kept closed in each such cycle.

5. Mechanism as defined by claim 1 wherein said operating means for said carrier comprises a uni-directional motor, a crank driven thereby, and a driving connection between said crank and said carrier raising and lowering member to vertically reciprocate the latter.

6. Mechanism as defined by claim 1 wherein said carrier comprises a vertically disposed sleeve having a rigid arm overhanging the body of molten glass to be gauged and carrying said feeler and said operating means for said carrier comprises a vertical rod having a fixed stop thereon spaced below the upper end of the rod, said vertical sleeve being slidable on said rod above said fixed stop and being adapted to rest on said fixed stop, a motor, a crank driven thereby, a plural-section yieldingly elongatable link operatively connecting the crank with said rod to vertically reciprocate said rod, and a vertically adjustable stop below and in the path of said fixed stop cooperative therewith to determine the lower limit of possible descent of said rod.

7. Mechanism as defined by claim 1 and in combination therewith a pair of normally open vertically spaced limit switches mounted to move vertically with said vertically reciprocating carrier raising and lowering member, a switch operating arm fixed to said feeler carrier to project between said switches and cooperative with the higher switch when said feeler carrier is stopped independently of said carrier raising and lowering member at a relatively raised level and for cooperation with the lower switch to close it when said feeler carrier is similarly stopped at a relatively lowered level, associate batch charging means adjustable to vary its charging rate, and normally inactive means operatively connecting said switches with said associate batch charging means to be actuated by closing of said higher switch to effect a relatively decreased charging rate of the associate charging means and by closing of the lower switch to effect a relatively increased charging rate of said batch charging means.

8. The combination as defined in claim 7 wherein the means to change the charging rate of the associate batch charging means comprises a reversible charging rate adjusting electric motor operatively connected to the charging means, electrical means operatively connecting said limit switches with said reversible adjusting motor to provide a closed circuit to operate the motor in one direction when one of said limit switches is closed and in the reverse direction when the other switch is closed.

9. The combination defined by claim 8 wherein said electrical means includes hold-in relays for the respective limit switches and a normally open timing switch, together with adjustable cam means driven by said operating means for said feeler carrier to close said timing switch at a predetermined time in each cycle of said operating means and to keep it closed for a predetermined time in that cycle.

10. The combination defined by claim 7 wherein said charging means comprises a pair of similar batch chargers, individual motors operatively connected thereto through adjustable speed drive units and control means to operate said motors and their connected chargers for alternating periods, and wherein the means to change the charging rate of said charging means comprises individual reversible adjusting electric motors operatively connected to the adjustable speed drive units of the chargers, and electrical means operatively connecting said limit switches with said adjusting motors and with the control means for the charger motors to provide a closed operating circuit from either limit switch, when closed, to either of said adjusting motors only when the corresponding charger motor is running.

MINOR G. KRETZMER, JR.

REFERENCES CITED

The following references are of record in the file of this patent:

UNITED STATES PATENTS

| Number | Name | Date |
|---|---|---|
| 1,961,893 | Wadman et al. | June 5, 1934 |
| 2,032,016 | Hitner | Feb. 25, 1936 |
| 2,053,938 | Barker | Sept. 8, 1936 |
| 2,098,963 | Hexter | Nov. 16, 1937 |
| 2,380,436 | Holdman | July 31, 1945 |